United States Patent
Inselberg

(10) Patent No.: US 8,401,578 B2
(45) Date of Patent: Mar. 19, 2013

(54) SYSTEM FOR SELECTIVELY DISABLING CELL PHONE TEXT MESSAGING FUNCTION

(76) Inventor: Eric Inselberg, Short Hills, NJ (US)

( * ) Notice: Subject to any disclaimer, the term of this patent is extended or adjusted under 35 U.S.C. 154(b) by 309 days.

(21) Appl. No.: 12/802,008

(22) Filed: May 27, 2010

(65) Prior Publication Data

US 2011/0294465 A1    Dec. 1, 2011

(51) Int. Cl.
*H04W 4/00* (2009.01)

(52) U.S. Cl. ............ 455/466; 455/3.03; 455/414.1; 455/569.2; 455/403; 455/152.1; 455/151.4; 455/297; 455/345; 455/575.9; 340/904; 701/36

(58) Field of Classification Search ........ 455/456.4, 455/152.1, 151.4, 151.1, 297, 345, 569.2, 455/575.9, 99, 3.03, 414.1, 403; 340/904, 340/938, 426.16, 426.22, 472, 4.6, 5.72; 701/36, 45, 49, 53

See application file for complete search history.

(56) References Cited

U.S. PATENT DOCUMENTS

| | | | |
|---|---|---|---|
| 6,021,119 A | 2/2000 | Derks et al. | 370/261 |
| 6,389,114 B1 | 5/2002 | Dowens et al. | 379/52 |
| 7,254,417 B2 | 8/2007 | Slemmer et al. | 455/556.1 |
| 7,302,272 B2 | 11/2007 | Ackley | 455/466 |
| 2003/0027594 A1* | 2/2003 | Pfoertner | 455/557 |
| 2003/0100337 A1 | 5/2003 | Chotkowski et al. | 455/556.1 |
| 2007/0233376 A1* | 10/2007 | Gershony et al. | 701/211 |
| 2010/0035588 A1* | 2/2010 | Adler et al. | 455/414.1 |
| 2011/0143786 A1* | 6/2011 | Fan et al. | 455/466 |
| 2011/0163949 A1* | 7/2011 | Chen et al. | 345/157 |
| 2011/0275358 A1* | 11/2011 | Faenger | 455/420 |

* cited by examiner

*Primary Examiner* — Kamran Afshar
*Assistant Examiner* — Khalid Shaheed
(74) *Attorney, Agent, or Firm* — Ernest D. Buff; Ernest D. Buff & Assoc. LLC; Gordon E. Fish

(57) ABSTRACT

A selective cell phone text messaging function disabling system prevents a vehicle occupant from text messaging while driving. Other occupants of the vehicle can text message using their cell phones. The driver's cell phone text messaging functionality is turned off by a signal broadcasting system as the driver enters the vehicle through the driver-side door. When the driver exits the vehicle through the driver-side door, the cell phone resumes its texting capability, preserving text messaging functionality while the driver is not operating the vehicle.

29 Claims, 5 Drawing Sheets

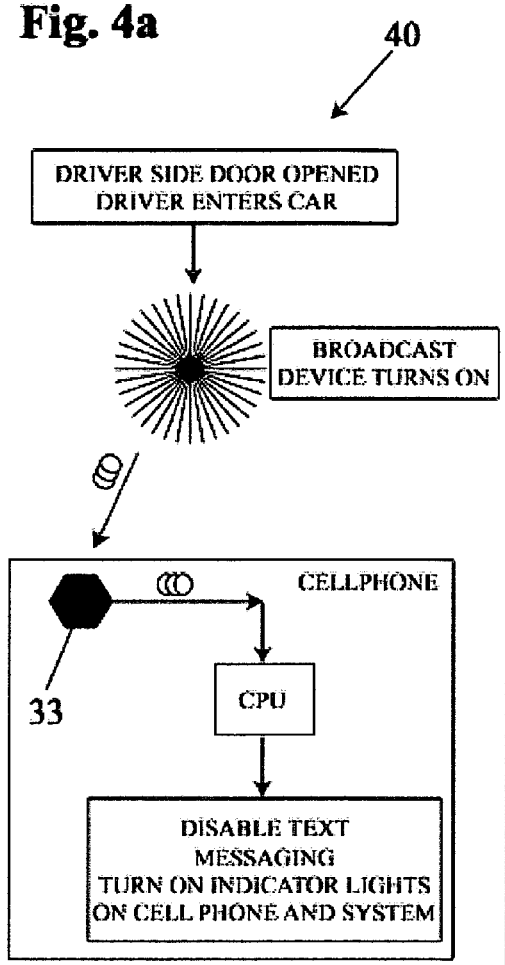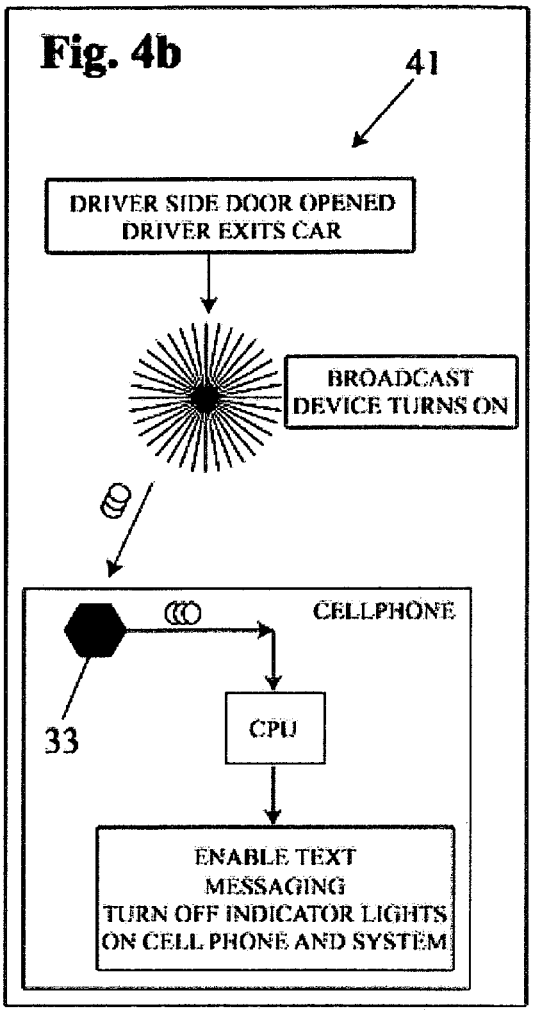

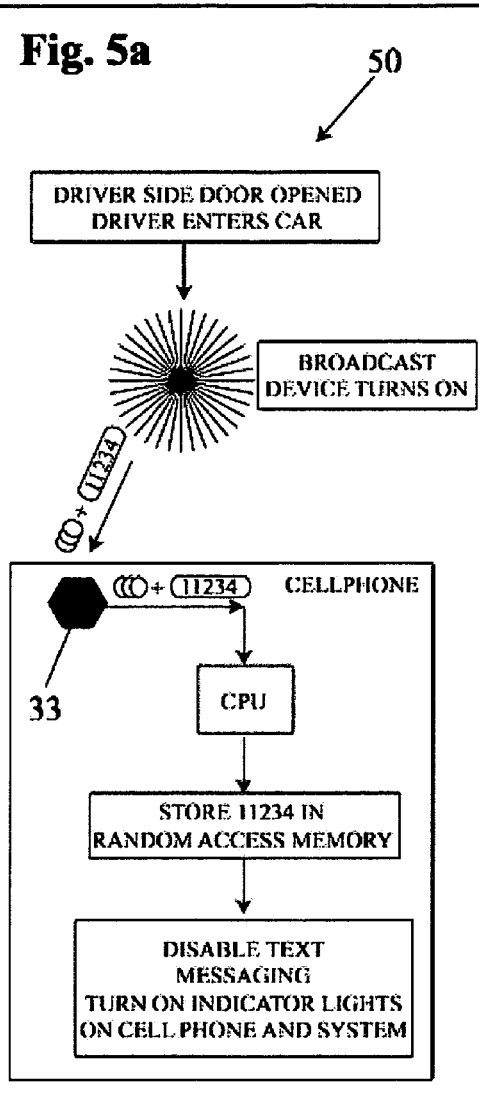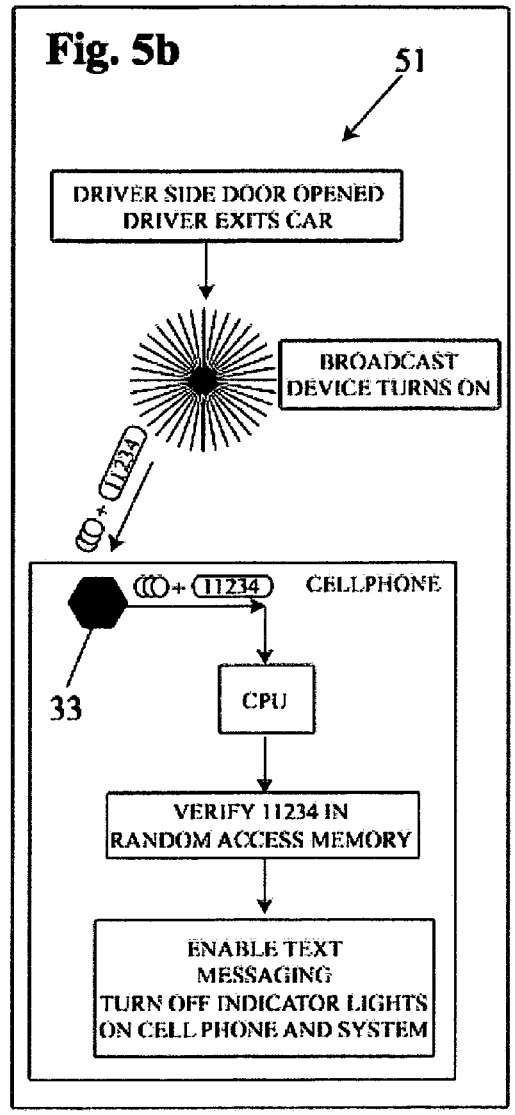

SYSTEM FOR SELECTIVELY DISABLING CELL PHONE TEXT MESSAGING FUNCTION

BACKGROUND OF THE INVENTION

1. Field of the Invention

The present invention relates to a cell phone system; and more particularly, to a system and method for inhibiting the sending of text messages from a cell phone by a driver operating a motor vehicle.

2. Description of the Prior Art

A number of prior art disclosures are related to the use of a cell phone in an automobile. Cell phones taught by these disclosures are generally connected by wire to a remote speaker and a microphone, permitting the phone to be used for telephone conversations while driving without being hand-held. Alternatively, a number of cell phone devices available in the market have Bluetooth® capability. These cell phones communicate wirelessly with a remote speaker and microphone, thereby enabling hands free cell phone conversations while driving. Today, personal digital assistants such as Blackberry™ and iPhone™ devices integrate the functionality of a personal digital assistant (PDA), an MP3 music player, and a cell phone in a single device. Some of these integrated devices can communicate to external devices using an infrared data stream communication similar to a remote control for a television. Such remote control devices have also been available with PALM™ personal digital assistants. Users of these devices can send address data from one PDA to another.

U.S. Pat. No. 6,389,114 to Dowens, et al. discloses a method and apparatus for relaying telephone communications. This telecommunication relay device relays communication from a first party to at least one second party, who may use terminals of different types such as telephone stations, text telephones, two-way pagers, personal digital assistants with communication capabilities, data network terminals, etc. The telecommunication relay device converts text received from text terminals into voice for voice terminals and converts voice to text and vice versa. The telecommunication relay device also permits the first party to leave messages for other parties. In addition, the telecommunication relay device may open a private chat room to allow communication between data network terminals and telephone stations, for example. The telecommunication relay device may also provide conferencing capability where the conferees may use different type terminals. With such devices, cell phone text entry is not disabled when driving an automobile.

U.S. Pat. No. 7,254,417 to Slemmer, et al. discloses carsafe messaging interfaces for interactive pagers and related methods. The messaging interface may be used in conjunction with interactive pagers and includes a housing that contains a message processing circuit, a user interface, and a communications circuit that is used to forward the text messages between the message processing circuit and an interactive pager. The user interface may be used to forward messages between a user of the interactive pager and the message processing circuit. The user interface comprises a microphone located within the housing. The user interface is configured to convey an audio message received via the microphone and the message processing circuit; it includes a voice recognition circuit that converts the audio message into a text message. A communications circuit coupled to the message processing circuit is configured to convey the text message from the message processing circuit to the interactive pager. In operation of the system disclosed by the '417 patent, text entry in the cell phone is not disabled while driving.

U.S. Pat. No. 7,302,272 to Ackley discloses a cell phone parental control method. Usage of a networked wireless device, including incoming communications, outgoing communications, text messaging and application launching, is controlled remotely. Controlling entities, such as parent cellular telephones or web sites, are provided with the ability to select a list of approved anytime incoming communications, or approved incoming and outgoing communications based on time and day. Incoming communications include text messaging and telephone calls. Further, the controlling entity is provided with the ability to reroute to the controlling entity any usage of the wireless device such as incoming communications, outgoing communications, and application launching. Access to usage logs of the wireless device is provided to the controlling entity. The parental control is enabled by the parent control device sending an SMS message to the child's wireless device. There is no indication that the driver of an automobile is disabled from entering text messages.

US Patent Application No. 20030100337 to Chotkowski, et al. discloses a wireless device for broadcasting information and related method for use with mobile wireless devices. A wireless device is provided for broadcast of information comprising a medium; a means for storing information on said medium; and a means for transmitting the information on said medium to various access points including a desktop personal computer, a handheld computer, a cellular phone or other mobile wireless devices. A related system and method for broadcasting information from the wireless device is also included. The broadcast information is data, not a command for shutting off text message capability of a cell phone used by a driver of an automobile.

In spite of all these advanced cell phone features, there remains a need in the art for a feature operative to disable use of the text messaging feature of a cell phone while driving. During text entry, the driver frequently takes his eyes off the road to assure that correct text is entered. The texting operation is widely regarded as being even more distracting than speaking in a hand-held cell phone. While many jurisdictions have already instituted laws prohibiting talking on a handheld cell phone while driving, the problem of drivers text messaging has yet to receive as much attention. This may, in part, be due to a lack of practical means to control or regulate text messaging by drivers. Therefore, there exists a need in the art for cell phone devices that can be disabled for text entry while driving, yet are available for text entry during all other times. Such a device would improve driver safety and the safety of others on the road.

SUMMARY OF THE INVENTION

The present invention provides a system that selectively disables the text messaging functionality of a cell phone carried by a driver during operation of a motor vehicle. The driver ordinarily accesses the vehicle through the door nearest the operating controls. A signal broadcasting system has an antenna or infrared light source that emits signals in a transmission zone proximate this door. For example, the emitter may be present within the driver-side automobile doorframe. The system is activated each time the driver door is opened. In some embodiments, this signal broadcasting system broadcasts a simple signal. In other embodiments the signal further includes a security authentication code. When the signal is received by an appropriate sensor embedded in the cell phone, it interprets the first simple broadcast signal to turn off the text messaging functionality of the cell phone; thereafter, the second simple broadcast signal is interpreted to turn on the text messaging functionality of the cell phone.

Some embodiments further include one or more security authentication codes, which may be stored both in the signal broadcasting system and cell phone random access memory when the driver enters the car door. When the signal broadcasting system sends the second broadcast signal during exit of the driver from the vehicle, the same security authentication code stored in memory is included. The cell phone verifies the security authentication codes match prior to turning on the text messaging functionality of the cell phone. Software present in the cell phone processes the receipt of the signal from the broadcast device and disables/enables the text messaging capability of the cell phone in a sequential manner. In addition, the cell phone and the signal broadcasting system optionally turn on a dashboard indicator light in the automobile and an indicator light in the face of the cell phone to indicate that the text messaging function is turned off. A driver looking at the cell phone and/or the dashboard of the automobile can clearly see that the text messaging function is turned off. When the text messaging function is turned on by the second passage of the cell phone through the driver-side doorframe, both the indicator lights are turned off.

The broadcasting device may communicate with the cell phone by a number of communication means, including a modulated radio frequency communication, low power piconet personal area network herein after referred to as Bluetooth® communication or modulated infrared communication. This broadcast signal may be a simple broadcast signal or may contain one or more security authentication codes. Infrared communication generally requires line of sight view of the cell phone while the modulated RF broadcast or Bluetooth® communication works without the need for direct line of sight view. Since the broadcast unit is only active when the driver's entry door into the automobile is open, and the signal generated has to work only in a very short range of effectiveness, so the power needed is minimal. Cell phones belonging to passengers entering the automotive through doors other than driver-side door do not receive the broadcast signal, with the result that the text messaging functionality of these cell phones is not disabled. Entry doors of passengers do not have a broadcasting device incorporated in the doorframe. Consequently, the text messaging function of these passenger cell phones remains intact.

If a passenger were to pass a cell phone to the driver with the text messaging function enabled, and the driver subsequently exited the driver-side door way with the cell phone, the text messaging function of the cell phone would be disabled, since the cell phone would be passing through the driver-side doorframe for the first time. This creates a major problem for the passenger's cell phone text messaging functionality. The cell phone indicator light would illuminate and, so long as the cell phone remained outside the vehicle, the text messing functionality could not be restored. This is especially the case when an authentication code is broadcast and stored in the cell phone and the signal broadcasting system. That feature of the system provides a valid incentive for a passenger to refrain from passing a cell phone to a driver while an automobile is being driven. The passenger cell phone text messaging capability could be reactivated by removing the battery or by executing a format/erase procedure of the cell phone random access memory. Both these operations are cumbersome and time consuming since a significant number of entries must be typed back into the cell phone. This system feature discourages a passenger from passing a text messaging function active cell phone to a driver of an automobile. The signal broadcasting system is reset by pressing a reset button. In any case, the passengers can send a text message on behalf of the driver when the automobile is being driven.

Optionally, the cell phone signal detection capability may be kept permanently turned on even when the cell phone is turned to an off-status. The cell phone antenna or infrared signal receiving sensor receives the signal from the antenna as the driver enters the open driver side door, even if the phone is ostensibly turned off. An interrupt is set in the CPU of the microprocessor of the cell phone so that when it is powered to an on-status, the interrupt disables the text messaging functionality of the cell phone that was initially turned off. If the driver were to exit the automobile through the drive side door without ever turning on the cell phone, the signal from the doorway antenna of the driver side of the automobile would again be received by the cell phone sensor and be processed to clear the interrupt that was initially set, thereby enabling text messaging functionality of the cell phone when the driver turns on the cell phone outside the automobile.

Briefly stated, one aspect of the invention involves a system that disables selectively the text messaging functionality of a cell phone during driving of an automobile. The system comprises a signal broadcasting system and a cell phone. The cell phone includes a selectively deactivatable text messaging functionality and comprises a sensor adapted to receive characteristic signals from the signal broadcasting system and a central processing unit (CPU) in communication with the sensor. The cell phone CPU includes an internal memory configured to store machine executable instructions. The CPU is operable to execute these instructions to detect and process the characteristic signals and to enable and disable the text messaging functionality. The signal broadcasting system comprises an emitter configured to emit characteristic signals in a transmission zone proximate the driver door. It is activated upon each opening of said driver door, and emits first and second characteristic signals during alternate activations.

The cell phone is configured to: (i) detect the first characteristic signal received by the sensor; (ii) disable the text messaging functionality in response to detection of the first characteristic signal; (iii) thereafter to detect a second characteristic signal received by the sensor; and (iv) re-enable the text messaging functionality in response to detection of the second characteristic signal. As a result, the driver of the motor vehicle is inhibited from text messaging while driving to thereby provide a higher level of safety for the driver and others on the roadway, and cell phones of passengers entering the automobile through doors other than the driver-side door have text messaging functionality available.

In different embodiments, the signal broadcasting system may comprise: (i) a wire loop antenna embedded in the driver-side doorframe that broadcasts a modulated radio frequency signal and a sensor in a cell phone having a radio frequency receiving antenna; (ii) a short range Bluetooth® modulated signal generator mounted on the driver-side doorframe that broadcasts a low signal power modulated signal and the sensor in the cell phone is a Bluetooth® receiver; (iii) a modulated infrared signal generator mounted on the driver-side doorframe and the sensor in the cell phone is an infrared receiver. The infrared signal based system requires a line of visibility of the cell phone to the signal broadcasting device. An article of clothing may not adequately shadow the signal from getting through to the cell phone. Optionally, the broadcast signal may include one or more dynamically generated or static security authentication codes which are needed to turn off or turn on the cell phone text messaging functionality of the cell phone as the driver enters and exits the automobile through the driver-side door. In this case, the one or more security codes are stored in the random access memory of the cell phone's solid-state memory as well as its system broadcast memory. The broadcast signal means is only provided on the driver-side door of the automobile and as a result a cell phone brought into the automobile through other doors, such as those belonging to the passengers in the automobile, will not have the text messaging functionality disabled.

In operation, when a driver enters the automobile through the driver-side door, the signal broadcast system is activated and sends a low power local signal to the cell phone. The sensor provided in the cell phone receives the broadcast signal and processes the signal to turn off the text messaging capability of the cell phone when the driver gets into the car seat of the automobile.

BRIEF DESCRIPTION OF THE DRAWINGS

The invention will be more fully understood and further advantages will become apparent when reference is made to the following detailed description of the preferred embodiments of the invention and the accompanying drawings, wherein like reference numerals denote similar elements throughout the several views, and in which:

FIG. 4A illustrates a sequence of events as a driver enters an automobile through the driver-side door, causing the cell phone text messaging functionality to be turned off;

FIG. 4B illustrates a subsequent sequence of events as a driver exits the automobile through the driver-side door, causing the cell phone text messaging functionality to be turned on;

FIG. 5A illustrates a sequence of events as a driver enters an automobile through the driver-side door, causing the signal broadcasting system to emit a signal that includes one or more security authentication codes and the cell phone text messaging functionality to be turned off; and FIG. 5B illustrates a subsequent sequence of events as the driver exits the automobile through the driver-side door, causing the signal broadcasting system to emit a signal that includes one or more security authentication codes and that are verified by the cell phone, so that and the cell phone text messaging functionality is turned on.

DETAILED DESCRIPTION OF THE INVENTION

Figure 1A:
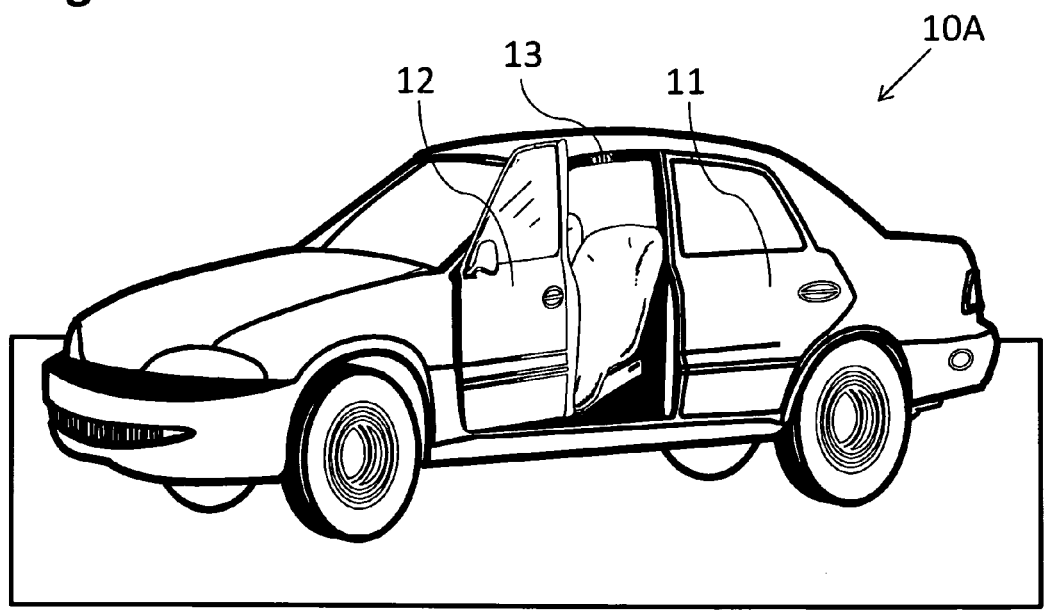
FIG. 1A illustrates a first embodiment of the invention wherein the driver-side doorframe of the automobile has a coil broadcasting a modulated radio frequency signal.

This invention relates to a system and method for inhibiting the operation of a cell phone by the operator of an automobile or other motor vehicle by selectively disabling the phone's text messaging functionality. The present system and method pertain to cell phones of any type that provides text messaging capability, including a standard cell phone, a cell phone with integrated MP3 player, a cell phone that is also a personal digital assistant, or a cell phone with a digital still or video camera capability, or a cell phone with any combination of the aforesaid features. Cell phones with such a combination of features include devices sold under the trade names iPhone™ and Blackberry™

It will be understood that the present text message disabling function may be implemented in connection with a wide range of motorized vehicles, including passenger cars, busses, trucks, off-road vehicles, heavy machines, or the like, as well as trains. As used herein, the term "driver" is thus to be understood as the operator of any vehicle of the aforementioned types, and is not limited to the operator of a passenger automobile.

Specifically, the cell phone text messaging capability is turned off only for the driver, while this feature is preserved for all other occupants of the vehicle. The functionality of the present system discourages passengers from passing a text messaging enabled cell phone to the driver, because in such cases, the cell phone text messaging capability may be disabled if the driver exits the automobile through the driver-side door carrying the passenger's cell phone.

Many jurisdictions have enacted laws prohibiting drivers from conversing using a hand-held cell phone. This sanctioned activity is considered to be dangerous and distracting. Tickets are issued for such misconduct. However, few jurisdictions have enacted comparable laws prohibiting a driver from for text messaging with a cell phone. In many respects, text messaging is believed to entail an even higher, on-going level of distraction than carrying on a voice telephone call, as a driver typically must look repeatedly at the keypad and screen of the cell phone to make sure that text is typed correctly. This requires the driver to take their eyes off the road, creating a distraction and a hazardous situation. In fact, cell phone text messaging is believed to be far more dangerous than vocal communications by drivers through hand-held cell phones. U.S. Pat. No. 7,254,417 to Simmer, et al. discloses a device that converts spoken words to a text message. Even with this disclosed device, the driver still has to look at the screen of the cell phone to assure that correct text is captured by the cell phone. Moreover, the device disclosed by the '417 patent does not prevent the driver from text messaging.

Briefly stated, the invention provides a system and method wherein a cell phone's text messaging functionality is selectively disabled for the driver of a motor vehicle.

An embodiment of the present system for selectively disabling a cell phone's text messaging function generally comprises: (i) a signal broadcasting system including an emitter disposed near or within a driver-side doorframe of a vehicle; (ii) a cell phone having a sensor responsive to the signal emanating from the signal broadcasting system and a central processing unit (CPU) programmed in software or hardware with executable instructions for processing signals received from the signal broadcasting system through the sensor. The signal broadcasting system in activated each time the driver's door is opened to emit a predetermined, characteristic signal. The cell phone CPU acts to selectively disable a text messaging functionality of the cell phone upon a first detection of the predetermined signal and to restore the text messaging functionality at the next successive detection of the predetermined signal. In this manner, the system operates to deactivate a cell phone carried by a driver entering the vehicle and thereafter to render the phone fully operational for text messaging after the driver leaves the car seat and exits the vehicle through the driver-side door.

Mechanisms suitable for carrying out the signal broadcasting function can include any one of the following: (i) a wire loop antenna embedded in the driver-side doorframe and configured to broadcast a modulated radio frequency signal to a sensor comprised of a radio frequency receiving antenna in the cell phone; (ii) a short range, Bluetooth®-modulated signal generator mounted in or near the driver-side doorframe that broadcasts a low signal power modulated signal adapted to be received by a Bluetooth®-enabled cell phone; or (iii) a modulated infrared signal generator mounted on or near the driver-side doorframe that transmits a signal to a sensor comprised of an infrared receiver in the cell phone. The infrared signal based system requires a line of visibility of the cell phone to the signal broadcasting device. An article of clothing may not adequately shadow the signal from getting through to the cell phone and will still enable the turning off the cell phone text messaging functionality. Each of the foregoing communication mechanisms provides for a suitable modulation to form an identifiable, predetermined characteristic transmitted signal.

The Bluetooth® protocol, promulgated by the Bluetooth Special Interest Group (SIG) trade association, provides a standard widely used for short-range, bi-directional wireless communication between electronic devices. This creates a piconet of personal area network accessed by many users and various devices. Many current cell phones include Bluetooth® capabilities, which are most commonly used to permit wireless communication between the phone and a small headset providing a microphone and an earphone for hands-free telephone conversation.

Other forms of wireless, electromagnetic transmission that permit signals to be exchanged between the cell phone and hardware present in the vehicle can also be used to implement the signal broadcasting function used in the present system and method.

Optionally, the broadcast signal includes one or more static or dynamically-generated security authentication codes to provide an additional measure of security and reliability in automatically causing the text messaging functionality of a cell phone to be turned off and on as a driver respectively gets into and out of an automobile through the front, driver-side door. Preferably, the one or more security codes are stored in a random access memory of the cell phone and in the memory of the signal broadcasting system.

The signal broadcast system preferably is configured to broadcast within a range such that only cell phones extant near the driver-side door of the automobile receive and respond to the deactivation/activation signal. Consequently, cell phones brought into the automobile through other doors, such as those utilized by the passengers in an automobile, will not have their text messaging functionality affected.

Thus, when a driver enters the automobile through the driver-side door, the broadcast signal system is activated and sends a low power, local signal to the cell phone. This signal broadcasting system is local, meaning that it is only effective at or near the front, driver-side door of the automobile. Without being bound by any theory, it is believed that in the case of the modulated radio frequency signal of the first embodiment, the coil configuration focuses the modulated radio frequency signal within the doorframe of the driver-side door. The return path of the magnetic flux field passes through the ferromagnetic doorframe. Hence, the signal broadcast is too weak to be effective elsewhere, such as at the door opening directly behind the driver-door opening. With this arrangement, the text messaging functionality is not deactivated for cell phones passed through any of the doors of the automobile other than the driver-side door.

A sensor within the cell phone receives the broadcast signal and processes the signal to turn off the cell phone's text messaging capability when the driver that carries it enters the vehicle through the driver-side door. When the driver exits, the text messaging function is re-enabled.

Typically the functioning of a cell phone is controlled by a central processing unit (CPU), which may take the form of a microprocessor, a microcontroller, or an application-specific integrated circuit. The cell phone normally includes an internal memory, which is often implemented using semiconductor flash or random access memory. Other memory forms, including magnetic and magnetooptical memories, may also be used.

There is a small chance that a passenger may possess a cell phone whose text messaging functionality has not disabled, and may pass that cell phone to a driver. This behavior is discouraged by an optional feature of the signal broadcasting system. As noted, the signal broadcasting system broadcasts a simple signal to sequentially turn the texting feature off and on. The signal broadcasting system optionally includes one or more security authentication codes in the signal it broadcasts. This authentication code may be dynamically generated. That is to say, every other time the signal broadcasting system is activated, it selects a new security authentication code and stores it in a memory storage unit incorporated in the automobile signal broadcast system. This code may be generated at random or selected sequentially or randomly from a finite repertoire of stored, predetermined choices. At the next activation, when the driver opens the door to exit the vehicle, the signal broadcast system again includes the same security authentication code in its transmission. In a similar manner, the cell phone also stores the security authentication code in its internal memory; upon receipt of the second signal from the signal broadcasting unit, the CPU compares the new authentication code with the first, stored code, and reactivates the cell phone text messaging function if the codes match.

The status of the cell phone's text message deactivation function is optionally indicated by indication means, such as indicator lights associated with either or both of the vehicle and the cell phone itself. After the signal broadcasting system is activated and the cell phone is passed through the driver-side automotive door, these indicator lights, if present, are both illuminated. Thereafter, when the driver exits the driver-side automobile door, the signal broadcasting system is again activated and the cell phone passes through the driver-side automobile door for a second time, and in response, both indicator lights are turned off, indicating that the system is ready to communicate with this or another cell phone and to cause deactivation of its text messaging functionality.

If a passenger passes a cell phone to the driver and the driver then exits the driver-side door with a passenger's telephone, its cell phone text messaging capability will be turned off. In that case, the system may consider this as a second passage of the driver's cell phone, which has the indicator light lit; and which, when contrary to the dashboard indicator light, indicates that there is a problem within the system. The signal broadcasting system has to be reset by pushing a reset button. The driver's cell phone, as well as the passenger's cell phone, may have to be initialized to erase the phone's internal memory. This may be done by removing the battery or activating a reset function, such as by entering one or more pre-selected keystrokes on the phone's keypad, which causes the phone's internal memory to be reset. Both actions require some effort and would likely discourage a passenger from passing a cell phone with an enabled text messaging, function to the driver. Instead, the driver will choose to request the passenger to send a text message to the party involved in lieu of the driver, and this action increases the safety margin for both the driver and others on the road.

FIG. 1A illustrates a first embodiment of the invention generally at 10A, wherein a coil 13 is disposed in the doorframe of the driver-side door 12. Coil 13 is configured to broadcast a modulated radio frequency signal. This signal is largely localized within the doorframe. The automobile includes a driver-side automobile door shown in the open position at 12; a door directly behind the driver is shown at 11. In this embodiment, the sensor in the cell phone is designed to receive the broadcast modulated radio frequency signal emanating from coil 13.

Figure 1B:
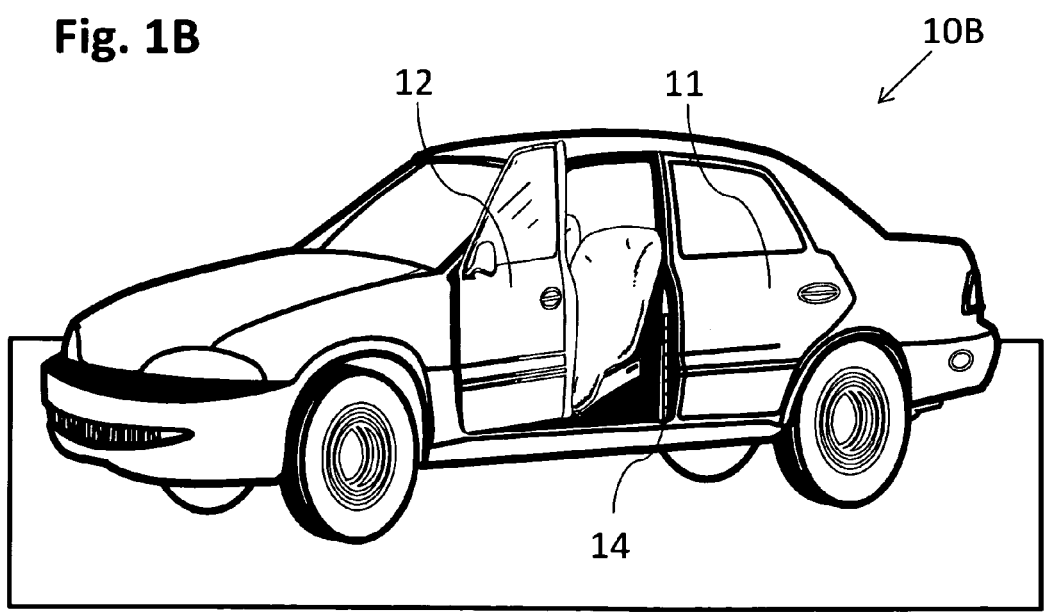
FIG. 1B illustrates a second embodiment of the invention wherein the driver-side doorframe of the automobile has an antenna broadcasting a modulated low signal strength Bluetooth® signal.

FIG. 1B illustrates a second embodiment of the invention generally at 10B, wherein the driver-side doorframe of the automobile has an antenna 14 operating in accordance with a Bluetooth® protocol to broadcast a low-power modulated Bluetooth® signal. This signal is largely localized within the driver-side doorframe. The cell phone in this embodiment is equipped to receive the Bluetooth® modulated signal broadcast by antenna 14.

Figure 1C:
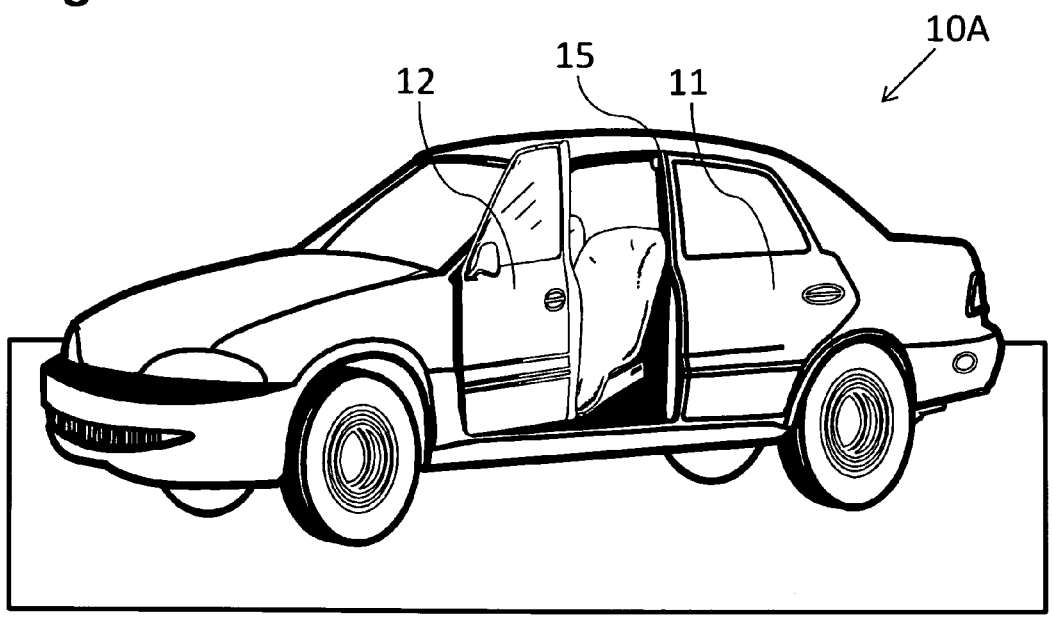
FIG. 1C illustrates a third embodiment of the invention wherein the driver-side doorframe of the automobile has an infrared light emitting diode broadcasting a modulated infrared signal.

FIG. 1C illustrates a third embodiment of the invention at 10C, wherein the driver-side doorframe of the automobile has an infrared source, such as light emitting diode 15 emitting a modulated infrared signal. The emitting source is configured such that the light it produces is localized within a small region proximate driver-side doorframe. A sensor in the cell phone used in this embodiment is designed to receive the modulated infrared signal. The modulated infrared communication requires a direct line of view from the signal broadcasting infrared emitting diode to the cell phone. This signal is generally large enough to go through articles of clothing, such as a shirt pocket, in which a driver's cell phone might be carried.

Figure 2:
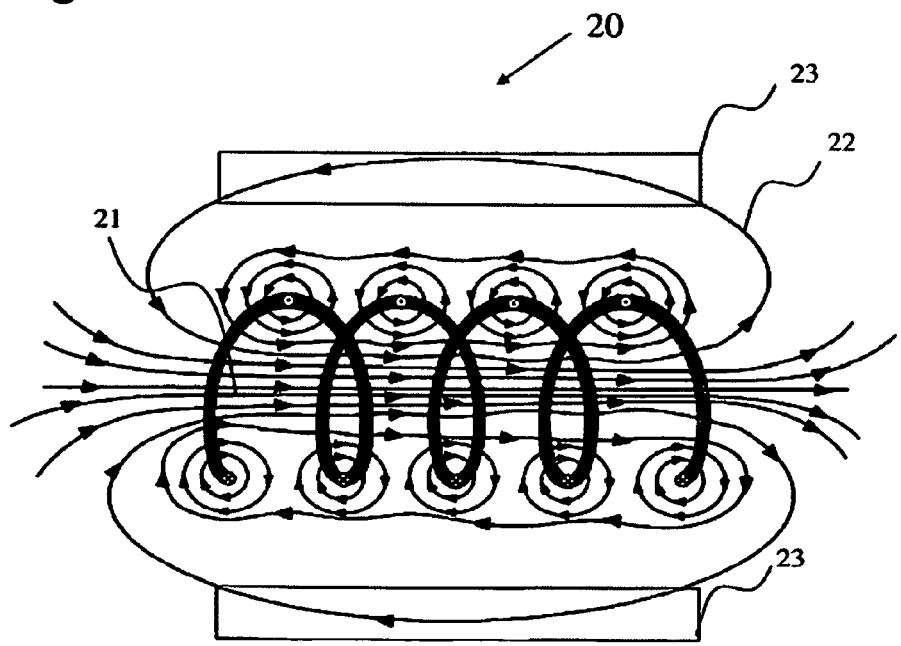
FIG. 2 illustrates the coil of the first embodiment, showing a concentrated magnetic field in the central region of the radio frequency generating coil and magnetic flux line returning through the door frame.

FIG. 2 illustrates at 20 the coil of the first embodiment showing a concentrated magnetic field 21 in the central region of the radio frequency generating coil. The returning magnetic flux lines 22 return through the doorframe 23. Since the door frames are made from steel, a ferromagnetic material, the return magnetic fields are largely contained within the door frame of door 12 and do not escape to the doorframe 11 directly behind the driver.

Figure 3:
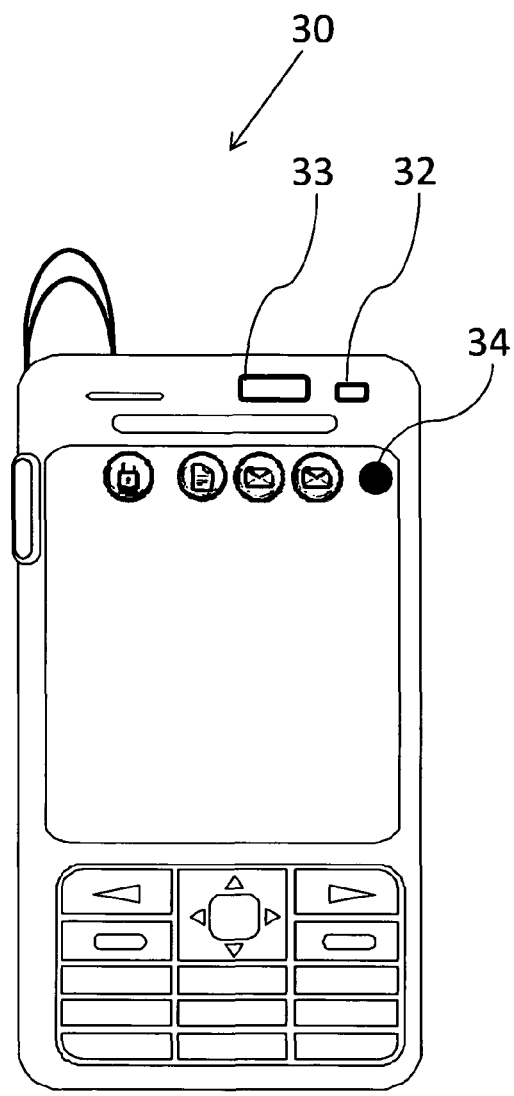
FIG. 3 illustrates a cell phone provided with a sensor for receiving signals from a signal broadcasting system.

FIG. 3 illustrates generally at 30 a cell phone 31 useful in connection with the present system. Phone 31 includes a sensor 33 adapted to receive a signal broadcast by the device attached, or in close proximity, to the frame of front driver-side door 12. The type of sensor used is chosen to make it responsive corresponds to the broadcast means chosen. For example, in the embodiments shown in FIGS. 1A-1C, the sensor must be of a type adapted to respond to a modulated radiofrequency signal, a low power modulated Bluetooth® antenna signal, or a modulated infrared signal, respectively. When the cell phone text messaging functionality is turned off, optional light 32 is turned to indicate the status of the cell phone.

FIGS. 4A and 4B illustrate the sequence of events in an embodiment of the present method. FIG. 4A illustrates at 40 a first portion of the sequence. The opening of the front, driver-side door of the vehicle triggers the signal broadcast system to emit its signal. For example, vehicles ordinary include a doorframe switch used to activate internal lights. The same contact closure also can be used to trigger the present system broadcasting function. It is preferred that the signal broadcasting system normally be turned off to save battery power, except when the driver-side front door is opened. When activated by the opening of the door, the signal broadcasting system broadcasts a signal, such as the modulated radio frequency signal, the low power modulated Bluetooth® signal, or the modulated infrared signal discussed above. This signal is received by a sensor 33 of the appropriate type provided within the cell phone and forwarded to a central processing unit (CPU) of the cell phone, which is configured to execute machine instructions that detect and process this signal and, in response, to disable the text messaging functionality of the cell phone. The cell phone CPU turns on optional indicator light (32 of FIG. 3) to indicate to the driver the status of the cell phone. Optionally, the system also turns on a car dashboard light indicating the status of the system—that the signal broadcasting system has been activated to broadcast the first characteristic signal and cause a cell phone passing through the driver-side door to have its cell phone text messaging functionality turned off.

FIG. 4B illustrates at 41 a complementary second portion of the sequence of events initiated when the driver exits the automobile through the driver-side door. When the driver opens the door to exit, the signal broadcasting system is again activated as shown. The signal thereby emitted is received by sensor 33 within the cell phone and is forwarded to the CPU of the cell phone, which is programmed to execute machine instructions that detect and process this signal to re-enable the text messaging functionality of the cell phone. The cell phone CPU turns off the indicator light (32 of FIG. 3) and the dash indicator light is extinguished.

FIGS. 5A and 5B depict the sequence of events in another embodiment of the present method. FIG. 5A illustrates at 50 a first portion of the sequence of events, wherein the driver enters the automobile through the driver-side door and the cell phone text messaging functionality is turned off in response. In this embodiment, the signal broadcasting system includes in its signal one or more security authentication codes. When the driver-side front door is opened, the signal broadcasting system is activated as shown. The signal broadcasting system is normally turned off to save battery power, except when the driver-side door is opened. The signal broadcasting system broadcasts its signal, which may be a modulated radio frequency signal, a low power modulated Bluetooth® signal or a modulated infrared signal. The signal additionally includes a security code, illustratively shown in FIG. 5A as "11234." This code may be a static code associated with the particular system or a dynamically generated random number. This signal is received by sensor 33 provided within the cell phone and is forwarded to the CPU of the cell phone, which is programmed with machine instructions that recognize the signal, including the code, and process it to disable the text messaging functionality of the cell phone. Both the cell phone CPU and the system memory may store the security authentication code. As before, the cell phone CPU turns on an indicator light (32 of FIG. 3) to indicate to the driver the status of the cell phone and a car dashboard light is turned on.

FIG. 5B illustrates at 51 a complementary second portion of the sequence of events as the driver exits the automobile through the driver-side door. In this case, the signal broadcasting system adds a security authentication code and the cell phone text messaging functionality is turned on. When the driver opens the door to exit, the signal broadcasting system is activated as shown. The signal broadcasting system is normally turned off, saving battery power except when the driver-side door is opened. The signal broadcasting system broadcasts its signal, which may be a modulated radio frequency signal, a low power modulated Bluetooth® signal, or a modulated infrared signal. The signal additionally includes a security code, illustratively shown in FIG. 5B as "11234," which was stored in the memory of the system and the cell phone random access memory. This signal is received by sensor 33 and is forwarded to the cell phone's CPU, which is programmed with machine instructions that recognize the signal, including the code, and process it to re-enable the text messaging functionality. The cell phone CPU verifies that the received security authentication code is identical to that stored in the cell phone's internal memory prior to reactivating the text messaging functionality of the cell phone. The cell phone CPU turns off the indicator light (32 of FIG. 3) and the car dashboard light is also turned off.

The selective cell phone text messaging function disabling system of the subject invention comprises one or more of the following salient features:

i) a signal broadcasting means embedded in the driver-side automobile doorframe broadcasting alternately an ON command followed by an OFF command activated when the door is driver-side opened in the form of a modulated radiofrequency signal or a low power Bluetooth signal or a modulated infrared signal activated only when the driver-side door is opened;

ii) said driver-side door being opened for the first time as the driver enters the driver seat to drive the automobile and the driver-side door being opened for the second time as the driver exits the said automobile;

iii) a cell phone provided with appropriate sensor to receive said broadcast signal and a central processing unit to turn off text messaging functionality of the cell phone upon receipt of the first broadcast signal and turn on the text messaging functionality of the cell phone upon receipt of the second broadcast signal;

iv) said cell phone and the automobile dashboard having an indication light that is turned on to indicate when said cell phone text messaging functionality is turned off, and turned off when cell phone text messaging function is turned on;

v) said broadcast signal being a simple sequenced ON/OFF command or sequenced ON/OFF command with one or more security authentication codes;

whereby a text messaging functionality of the cell phone of the driver is disabled while that of passengers entering the automobile through doors other than driver-side door is preserved.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture. The various processes and functions described herein may either be part of the micro instruction code or part of the application program (or a combination thereof) which is executed via the operating system. In addition, various other peripheral devices may be connected to the computer platform such as an additional data storage device and a printing device, It is to be further understood that, because some of the constituent system components and method steps depicted in the accompanying figures may be implemented in various hardware and software forms, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. For use in a motor vehicle having a driver door providing access for a driver, a selective cell phone text messaging function disabling system, comprising a signal broadcasting system and a cell phone, and wherein:

a. said cell phone has a selectively deactivatable text messaging functionality and comprises:
      i. a sensor adapted to receive characteristic signals from said signal broadcasting system;
      ii. a central processing unit in communication with said sensor and including an internal memory configured to store machine executable instructions, said central processing unit being operable to execute said instructions to detect and process said characteristic signals and to enable and disable said text messaging functionality; and
   b. said signal broadcasting system comprises an emitter configured to emit characteristic signals in a transmission zone proximate said driver door, said signal broadcasting system being activated upon opening of said driver door, first and second characteristic signals being emitted during alternate activations of said signal broadcasting system; and
   c. said cell phone is configured to:
      i. detect said first characteristic signal received by said sensor;
      ii. disable said text messaging functionality in response to detection of said first characteristic signal;
      iii. thereafter to detect a second characteristic signal received by said sensor; and
      iv. re-enable said text messaging functionality in response to detection of said second characteristic signal,
   d. said broadcast signal is a simple signal that commands said cell phone text messaging functionality off during entry through said driver door and turns on said cell phone text messaging functionality during exit through said driver door; and
   e. said signal broadcasting system turns on a dash indicator light in the dashboard of said vehicle upon transmission of said first characteristic signal and said sensor enabled cell phone turns on a phone indicator light in the cell phone upon receipt of said first characteristic signal;

whereby a driver of said motor vehicle is inhibited from text messaging while driving to thereby provide a higher level of safety for the driver and others on the roadway, and cell phones of passengers entering said vehicle through doors other than said driver-side door have text messaging functionality available.

2. The selective cell phone text messaging function disabling system as recited by claim 1, wherein the signal broadcasting system is selected from a modulated radiofrequency signal means, a modulated low power piconet personal area network signal means, or a modulated infrared light signal means.

3. The selective cell phone text messaging function disabling system as recited by claim 1, wherein said first signal further includes one or more first security authentication codes and said second characteristic signal further includes the same one or more second security authentication codes.

4. The selective cell phone text messaging function disabling system as recited by claim 1, wherein said signal broadcasting system turns off said dash indicator light upon transmission of said second characteristic signal and said sensor enabled cell phone turns off said phone indicator light upon receipt of said second characteristic signal.

5. The selective cell phone text messaging function disabling system as recited by claim 3, wherein said signal broadcasting system turns on a dash indicator light in the dashboard of said vehicle upon transmission of said first characteristic signal and said sensor enabled cell phone turns on a phone indicator light in the cell phone upon receipt of said first characteristic signal.

6. The selective cell phone text messaging function disabling system as recited by claim 5, wherein said signal broadcasting system turns off said dash indicator light upon transmission of said second characteristic signal and said sensor enabled cell phone turns off said phone indicator light upon receipt of said second characteristic signal.

7. The selective cell phone text messaging function disabling system as recited by claim 1, wherein the cell phone sensor is permanently turned on regardless the cell phone is turned on or turned off and the passage of a turned off cell phone that is turned off through the driver side vehicle doorway broadcast unit sets a cell phone CPU interrupt so that when the cell phone is turned on inside the vehicle, the text messaging functionality is turned off.

8. The selective cell phone text messaging function disabling system as recited by claim 7, wherein the turned off cell phone is never turned on by the driver and is passed through the driver side door way for a second time as the drive exits the vehicle, the cell phone sensor receives the signal from driver side doorway broadcast unit removing the cell phone CPU interrupt, thereby enabling the text messaging functionality when the driver turns on the cell phone outside the vehicle.

9. A method for deactivating a text messaging functionality of a cell phone carried by a driver operating a motor vehicle assumed to comprise: (i) a driver door providing access for the driver and (ii) a signal broadcasting system adapted to emit characteristic signals in a transmission zone proximate said driver door, and the cell phone being assumed capable to: (i) receive and process the characteristic signals and (ii) selectively enable and disable the text messaging functionality, the method comprising:
   a. activating said signal broadcasting system to emit a first characteristic signal during a first opening of said driver door;
   b. first detecting with said cell phone said emission of said first characteristic signal;
   c. disabling said text messaging functionality of said cell phone in response to said first detecting of said first characteristic signal;
   d. thereafter, activating said signal broadcasting system to emit a second characteristic signal during the next subsequent opening of said driver door;
   e. second detecting with said cell phone said emission of said second characteristic signal; and
   f. re-enabling said text messaging functionality of said cell phone in response to said second detecting of said emission of said second characteristic signal;
   where said first characteristic signal comprises a first authentication code and said second characteristic signal comprises a second authentication code: and said first and second activation codes are changed at each activation of said signal broadcasting system to emit a said first characteristic signal.

10. A method as recited by claim 9, wherein said cell phone comprises a sensor operative to receive said characteristic signals and a central processing unit in communication with said sensor and comprising executable instructions stored in an internal memory operative to enable and disable said text messaging functionality.

11. A method as recited by claim 9, wherein said transmission zone is confined to a region through which said driver enters and exits said motor vehicle.

12. A method as recited by claim 9, wherein said signal is a simple signal.

13. A method as recited by claim 9, wherein said first and second characteristic signals are substantially identical.

14. A method as recited by claim 9, wherein said first detecting comprises processing said first characteristic signal to recover said first authentication code and store it in an internal memory of said cell phone and said second detecting comprises processing said second characteristic signal to recover said second authentication code, and said method comprises comparing said first and second authentication codes, and said re-enabling is carried out only if said first and second authentication codes match.

15. A method as recited by claim 9, wherein said activation codes are selected from a repertoire of codes stored by said signal broadcast system.

16. A method as recited by claim 9, wherein said cell phone comprises a phone indicator, and said method further comprises activating said phone indicator in response to said first detecting and deactivating said phone indicator in response to said second detecting.

17. A method as recited by claim 9, wherein said signal broadcasting system in said vehicle comprises a dash indicator, and said method further comprises activating said dash indicator in response to emission of said first characteristic signal and deactivating said dash indicator in response to s emission of said first characteristic signal.

18. A method as recited by claim 9, wherein said cell phone has an off-state and an on-state and is configured to be turned reversibly from said off-state to said on-state by a user, said sensor and said central processing unit remain operative while said cell phone is in said off-state, said first detecting comprises setting a CPU interrupt in said central processing unit and said second detecting comprises clearing said CPU interrupt, and said method further comprises disabling said text messaging functionality of said cell phone if said phone is turned from said off-state to said on-state while said CPU interrupt is set.

19. A method as recited by claim 9, further comprising resetting said cell phone to enable said text messaging functionality, said resetting being effected by depressing a predetermined set of one or more keystrokes entered on a keypad of said cell phone.

20. A method as recited by claim 9, further comprising resetting said signal broadcasting system such that the next activation of said signal broadcasting system emits a said first characteristic signal.

21. For use in a motor vehicle having a driver door providing access for a driver, a selective cell phone text messaging function disabling system, comprising a signal broadcasting system and a cell phone, and wherein:
   a. said cell phone has a selectively deactivatable text messaging functionality and comprises:
      i. a sensor adapted to receive characteristic signals from said signal broadcasting system;
      ii. a central processing unit in communication with said sensor and including an internal memory configured to store machine executable instructions, said central processing unit being operable to execute said instructions to detect and process said characteristic signals and to enable and disable said text messaging functionality; and
   b. said signal broadcasting system comprises an emitter configured to emit characteristic signals in a transmission zone proximate said driver door, said signal broadcasting system being activated upon opening of said driver door, first and second characteristic signals being emitted during alternate activations of said signal broadcasting system; and c. said cell phone is configured to:
  i. detect said first characteristic signal received by said sensor;
  ii. disable said text messaging functionality in response to detection of said first characteristic signal;
  iii. thereafter to detect a second characteristic signal received by said sensor; and
  iv. re-enable said text messaging functionality in response to detection of said second characteristic signal, d. said signal broadcasting system turns on a dash indicator light in the dashboard of said vehicle upon transmission of said first characteristic signal and said sensor enabled cell phone turns on a phone indicator light in the cell phone upon receipt of said first characteristic signal;

whereby a driver of said motor vehicle is inhibited from text messaging while driving to thereby provide a higher level of safety for the driver and others on the roadway, and cell phones of passengers entering said vehicle through doors other than said driver-side door have text messaging functionality available.

22. The selective cell phone text messaging function disabling system as recited by claim 21, wherein the signal broadcasting system is selected from a modulated radiofrequency signal means, a modulated low power piconet personal area network signal means, or a modulated infrared light signal means.

23. The selective cell phone text messaging function disabling system as recited by claim 21, wherein said broadcast signal is a simple signal that commands said cell phone text messaging functionality off during entry through said driver door and turns on said cell phone text messaging functionality during exit through said driver door.

24. The selective cell phone text messaging function disabling system as recited by claim 21, wherein said first signal further includes one or more first security authentication codes and said second characteristic signal further includes the same one or more second security authentication codes.

25. The selective cell phone text messaging function disabling system as recited by claim 23, wherein said signal broadcasting system turns on a dash indicator light in the dashboard of said vehicle upon transmission of said first characteristic signal and said sensor enabled cell phone turns on a phone indicator light in the cell phone upon receipt of said first characteristic signal.

26. The selective cell phone text messaging function disabling system as recited by claim 21, wherein said signal broadcasting system turns off said dash indicator light upon transmission of said second characteristic signal and said sensor enabled cell phone turns off said phone indicator light upon receipt of said second characteristic signal.

27. The selective cell phone text messaging function disabling system as recited by claim 21, wherein said signal broadcasting system turns off said dash indicator light upon transmission of said second characteristic signal and said sensor enabled cell phone turns off said phone indicator light upon receipt of said second characteristic signal.

28. The selective cell phone text messaging function disabling system as recited by claim 21, wherein the cell phone sensor is permanently turned on regardless the cell phone is turned on or turned off and the passage of a turned off cell phone that is turned off through the driver side vehicle doorway broadcast unit sets a cell phone CPU interrupt so that when the cell phone is turned on inside the vehicle, the text messaging functionality is turned off.

29. The selective cell phone text messaging function disabling system as recited by claim 28, wherein the turned off cell phone is never turned on by the driver and is passed through the driver side door way for a second time as the drive exits the vehicle, the cell phone sensor receives the signal from driver side doorway broadcast unit removing the cell phone CPU interrupt, thereby enabling the text messaging functionality when the driver turns on the cell phone outside the vehicle.

\* \* \* \* \*